(12) United States Patent
Getson et al.

(10) Patent No.: US 11,403,416 B2
(45) Date of Patent: *Aug. 2, 2022

(54) SECURE INTELLIGENT NETWORKED ARCHITECTURE, PROCESSING AND EXECUTION

(71) Applicant: Capitalogix IP Owner, LLC, Coppell, TX (US)

(72) Inventors: Howard M. Getson, Coppell, TX (US); Sean Vallie, Lantana, TX (US); Robert Jump, Cincinnati, OH (US); Prince Modi, Richardson, TX (US); Derek Ainsworth, Dallas, TX (US); Daniel Hittler, Dallas, TX (US)

(73) Assignee: Capitalogix IP Owner, LLC, Coppell, TX (US)

( * ) Notice: Subject to any disclaimer, the term of this patent is extended or adjusted under 35 U.S.C. 154(b) by 76 days.

This patent is subject to a terminal disclaimer.

(21) Appl. No.: 17/086,190

(22) Filed: Oct. 30, 2020

(65) Prior Publication Data

US 2021/0049293 A1 Feb. 18, 2021

Related U.S. Application Data

(63) Continuation of application No. 16/517,418, filed on Jul. 19, 2019, now Pat. No. 10,824,753, which is a
(Continued)

(51) Int. Cl.
*G06F 7/04* (2006.01)
*G06F 17/30* (2006.01)
(Continued)

(52) U.S. Cl.
CPC .............................. *G06F 21/6218* (2013.01)

(58) Field of Classification Search
CPC .... G06F 21/6218; G06F 9/505; G06F 9/5083; G06F 9/5088; G06F 9/4843; G06F 9/52;
(Continued)

(56) References Cited

U.S. PATENT DOCUMENTS

| 5,761,442 A | 6/1998 | Barr et al. |
| 6,578,068 B1 | 6/2003 | Bowman-Amuah |

(Continued)

FOREIGN PATENT DOCUMENTS

| CN | 101276454 A | 10/2008 |
| CN | 102136099 A | 7/2011 |

(Continued)

OTHER PUBLICATIONS

Koskinen et al., "Exploring Algorithms for Automated FX Trading—Constructing a Hybrid Model," Seminar on Case Studies in Operations Research, Helsinki University of Technology, 2008, pp. 1-50.

(Continued)

*Primary Examiner* — Amie C. Lin
(74) *Attorney, Agent, or Firm* — Carr & Ferrell LLP

(57) ABSTRACT

Provided are exemplary systems and methods for secure intelligent networked architecture, processing and execution. Exemplary embodiments include an intelligent networked architecture comprising an intelligent agent, a secure cloud of a plurality of specialized intelligent historical agents, a plurality of secure cloud based specialized insight servers configured to transform secure digital data into a scrubbed situational deployment trigger, and an intelligent operational agent configured to receive the scrubbed situational deployment trigger.

20 Claims, 8 Drawing Sheets

Related U.S. Application Data continuation of application No. 15/201,005, filed on Jul. 1, 2016, now Pat. No. 10,423,800.

(51) Int. Cl.
*H04N 7/16* (2011.01)
*G06F 21/62* (2013.01)

(58) Field of Classification Search
CPC ...... G06F 9/4881; G06F 9/485; G06F 9/5027; H04L 29/08072; H04L 29/06; H04L 29/08135; H04L 29/08648; H04L 29/08981; H04L 29/08144; H04L 29/08171
See application file for complete search history.

(56) References Cited

U.S. PATENT DOCUMENTS

| | | | |
|---|---|---|---|
| 6,735,580 B1 | 5/2004 | Li et al. | |
| 7,644,863 B2 | 1/2010 | Chen et al. | |
| 7,805,344 B2 | 9/2010 | Smith | |
| 7,882,014 B2 | 2/2011 | Shapiro et al. | |
| 8,250,102 B2 | 8/2012 | Madhavarapu et al. | |
| 8,285,658 B1 | 10/2012 | Kellas-Dicks et al. | |
| 8,442,885 B1 | 5/2013 | Carrie et al. | |
| 8,626,522 B2 | 1/2014 | Greenwood | |
| 9,529,634 B1* | 12/2016 | Hsu | G06F 9/46 |
| 9,626,503 B2 | 4/2017 | Jung et al. | |
| 9,934,000 B2 | 4/2018 | Sherwood et al. | |
| 10,387,679 B2 | 8/2019 | Getson et al. | |
| 10,423,800 B2 | 9/2019 | Getson et al. | |
| 10,795,893 B2 | 10/2020 | Getson et al. | |
| 10,824,753 B2 | 11/2020 | Getson et al. | |
| 2002/0095400 A1 | 7/2002 | Johnson et al. | |
| 2003/0046159 A1 | 3/2003 | Ebrahim et al. | |
| 2003/0217129 A1* | 11/2003 | Knittel | H04L 41/22 709/223 |
| 2004/0205110 A1 | 10/2004 | Hinshaw | |
| 2005/0203892 A1 | 9/2005 | Wesley et al. | |
| 2006/0101062 A1 | 5/2006 | Godman et al. | |
| 2007/0288466 A1* | 12/2007 | Bohannon | G06Q 10/06 |
| 2009/0012760 A1 | 1/2009 | Schunemann | |
| 2009/0125370 A1 | 5/2009 | Blondeau et al. | |
| 2011/0153445 A1* | 6/2011 | Huang | G06Q 30/06 713/168 |
| 2011/0185063 A1 | 7/2011 | Head et al. | |
| 2011/0246298 A1 | 10/2011 | Williams et al. | |
| 2012/0023035 A1 | 1/2012 | Kuhnle et al. | |
| 2012/0257820 A1 | 10/2012 | Sanghvi et al. | |
| 2012/0259762 A1 | 10/2012 | Tarighat et al. | |
| 2012/0324446 A1 | 12/2012 | Fries et al. | |
| 2013/0024395 A1 | 1/2013 | Clark et al. | |
| 2013/0138577 A1 | 5/2013 | Sisk | |
| 2013/0211990 A1 | 8/2013 | Zhong | |
| 2013/0325918 A1 | 12/2013 | Sherwood et al. | |
| 2014/0052421 A1 | 2/2014 | Allen et al. | |
| 2014/0122480 A1 | 5/2014 | Jung et al. | |
| 2014/0215033 A1* | 7/2014 | Ravichandran | H04L 29/08072 709/221 |
| 2015/0127628 A1 | 5/2015 | Rathod | |
| 2015/0254556 A1 | 9/2015 | Getson et al. | |
| 2015/0254765 A1 | 9/2015 | Getson et al. | |
| 2015/0302303 A1 | 10/2015 | Hakim | |
| 2016/0021157 A1 | 1/2016 | Duerring | |
| 2016/0335532 A1 | 11/2016 | Sanghavi et al. | |
| 2017/0018034 A1* | 1/2017 | Wainman | G06Q 40/12 |
| 2017/0180272 A1 | 6/2017 | Bernath | |
| 2018/0004969 A1 | 1/2018 | Getson et al. | |
| 2018/0196964 A1 | 7/2018 | Getson et al. | |
| 2019/0340380 A1 | 11/2019 | Getson et al. | |
| 2019/0354722 A1 | 11/2019 | Getson et al. | |
| 2020/0201871 A1 | 6/2020 | Getson et al. | |

FOREIGN PATENT DOCUMENTS

| | | |
|---|---|---|
| CN | 102333126 A | 1/2012 |
| CN | 102393894 A | 3/2012 |
| CN | 102523166 A | 6/2012 |
| CN | 102663649 A | 9/2012 |
| CN | 102713849 A | 10/2012 |
| CN | 103412792 A | 11/2013 |
| CN | 103493008 A | 1/2014 |
| CN | 106462794 A | 2/2017 |
| CN | 106462795 A | 2/2017 |
| CN | 109804360 A | 5/2019 |
| CN | 110383245 A | 10/2019 |
| CN | 106462795 B | 5/2020 |
| CN | 111488975 A | 8/2020 |
| ID | 202000594 A | 3/2020 |
| SG | 11201607309 T | 9/2019 |
| SG | 11201607320 T | 10/2019 |
| WO | WO2013082119 A1 | 6/2013 |
| WO | WO2015134991 A1 | 9/2015 |
| WO | WO2015134992 A1 | 9/2015 |
| WO | WO2018005170 A1 | 1/2018 |
| WO | WO2018128998 A1 | 7/2018 |

OTHER PUBLICATIONS

Akhtar et al., Distributed Online Banking, retrieved from <http://www.micsymposium.org/mics_2004/Akhtar.pdf>, 2004, pp. 1-14.
"International Search Report and Written Opinion of the International Searching Authority," Patent Cooperation Treaty Application No. PCT/US2017/038375, dated Sep. 12, 2017, 7 pages.
"Office Action," Singapore Patent Application No. 11201607320T, dated Nov. 15, 2017, 8 pages.
"Office Action," Singapore Patent Application No. 11201607309T, dated Nov. 15, 2017, 8 pages.
Lo, Andrew W. et al., "Foundations of Technical Analysis: Computational Algorithms, Statistical Inference, and Empirical Implementation," The Journal of Finance, vol. 55 No. 4, Aug. 2000, pp. 1705-1765.
Percival, Scott, "Backtesting and Data Mining," trade2win.com [online], Dec. 23, 2007 [retrieved on Nov. 20, 2017], Retrieved from the Internet: <URL:https://web.archive.org/web/20130601132145/http://www.trade2win.com/articles/1258-backtesting-data-mining>, 8 pages.
"International Search Report" and "Written Opinion of the International Searching Authority," Patent Cooperation Treaty Application No. PCT/US2018/012111, dated Mar. 26, 2018, 8 pages.
"Office Action," Singapore Patent Application No. 11201607309T, dated Jun. 12, 2018, 5 pages.
"Office Action," Singapore Patent Application No. 11201607320T, dated Jun. 8, 2018, 4 pages.
"Office Action," Chinese Patent Application No. 201580012482.5, dated Jun. 21, 2018, 7 pages (16 pages including translation).
Cui et al., "A nerve net invading detect model research based on inerratic detect by virtual machine running," Computer Science and Technique Department of Yunnan Police Officer Academy, Yunnan Kunming, 650223, China, Jun. 30, 2007, pp. 109-112.
"Office Action," Chinese Patent Application No. 201580012465.1, dated Jun. 21, 2018, 3 pages [5 pages including translation].
Rohit et al., "Large Data and Computation in a Hazard Map Workflow Using Hadoop and Neteeza Architectures," ACM, Nov. 18, 2013, pp. 7-12.
"Office Action," Chinese Patent Application No. 201580012482.5, dated Jan. 31, 2019, 4 pages (9 pages including translation).
"Office Action," Chinese Patent Application No. 201580012465.1, dated Feb. 1, 2019, 6 pages (12 pages including translation).
Orrantia, Jorge, "DMForex: A Data Mining Application to Predict Currency Exchange Rates and Trends," California State University Northridge Masters Thesis, 2012, pp. 1-67.
"Notice of Allowance" Singapore Patent Application No. 11201607309T, dated May 8, 2019, 6 pages.
"Notice of Allowance" Singapore Patent Application No. 11201607320T, dated May 15, 2019, 5 pages.

(56) References Cited

OTHER PUBLICATIONS

"Office Action," Chinese Patent Application No. 201580012465.1, dated Aug. 19, 2019, 6 pages (14 pages including translation).
"Office Action," Indonesian Patent Application No. P00201606735, dated Aug. 19, 2019, 2 pages (4 pages including translation).
"Office Action," Indonesian Patent Application No. P00201606736, dated Aug. 15, 2019, 2 pages (4 pages including translation).
"Office Action," Chinese Patent Application No. 201580012482.5, dated Sep. 2, 2019, 5 pages.
"International Search Report" and "Written Opinion of the International Searching Authority," Patent Cooperation Treaty Application No. PCT/US2015/019509, dated Jun. 24, 2015, 12 pages.
"International Search Report" and "Written Opinion of the International Searching Authority," Patent Cooperation Treaty Application No. PCT/US2015/019514, dated Jun. 19, 2015, 10 pages.
"Notice of Allowance" Chinese Patent Application No. 201580012482.5, dated Feb. 3, 2020, 4 pages (6 pages including translation).
"Office Action," Singapore Patent Application No. 11201811518U, dated Mar. 24, 2020, 6 pages.
"Office Action," Chinese Patent Application No. 201580012465.1, dated Apr. 23, 2020, 6 pages (13 pages including translation).
"Office Action," Singapore Patent Application No. 11201906224R, dated Aug. 20, 2020, 5 pages.
"Office Action," Chinese Patent Application No. 201580012465.1, dated Nov. 5, 2020, 10 pages (18 pages including translation).
Liu, Jiyuan, "Natural Disasters and Spatial Information System", Sep. 30, 2013, 33 pages.
"Office Action", Singapore Patent Application No. 10201906293Y, dated Feb. 9, 2021, 24 pages.
"Notice of Allowance" China Patent Application No. 201580012465.1, dated Mar. 26, 2021, 2 pages [4 pages with translation].
Pan et al., "An Intelligent Agent Framework for Enterprise Integration", IEEE Transactions On Syystems, Man, And Cybernetics, vol. 211, No. 6, 1991, pp. 1391-1408.
Ezzeddine et al., "An intelligent Framework for the Cooperation in the Extended Enterprise Environment", IEEE, 2011, pp. 379-384.
Podpora et al., "Intelligent Real-Time Adaptation for Power Efficiency in Sensor Networks", IEEE Sensors Journal, vol. 8, No. 12, Dec. 2008, pp. 2066-2073.
Merdan et al., "Intelligent-Agent based Approach for Assembly Automation", E Conference on Soft Computing in Industrial Applications, Jun. 2008, pp. 13-19.
Yan, "The Research of Active Data Warehouse Based on Multi-agent", IEEE, 2012, pp. 1-4.
Koskinen et al., "Exploring Algorithms for Automated FX Trading—Constructing a Hybrid Model," Seminar on Case Studies in Operations Research, Helsinki University of Technology, May 15, 2003, 50 pages.
Orrantia, Jorge, "DMForex: A Data Mining Application to Predict Currency Exchange Rates and Trends," Masters Thesis, California State University, Northridge, May 2012, 67 pages.

\* cited by examiner

| Digital Data Element | Name | Example | Example | Example | Example | Example |
|---|---|---|---|---|---|---|
| First | Resource | Football Players | Workers | Equities | Vehicles | Drugs - Biologics |
| Second | Resource Segment | College Football | Lawyers | NYSE | Trucks | Monoclonal Antibodies ("Mabs") |
| Third | Item | Running Backs | Patent Lawyers | GM Stock | Ford Trucks | Cancer Mabs |
| Fourth | Look Back Period | Last Two Seasons | Last Month | Last Ten Years | Last Thirty Years | Last 5,000 Patients |
| Fifth | Performance Metric | Yards Per Carry | Hours Billed | Risk Adjusted Performance | Miles Per Gallon | Disease Free Months |
| Sixth | Condition | Snow | Recession | Bear Market | Record Gas Prices | Lung Adenocarcinoma |
| Seventh | Allocation Amount | Ten Players | Ten Workers | Ten Thousand Dollars | Ten Vehicles | Amount of Computing Resources |
| Eighth | % to Select | Top 10% | Top 2% | Top 1% | Top 4% | Top 30% |
| Ninth | Outlier to Eliminate | Top 1% and Bottom 1% | Top 5% and Bottom 1% | N/A | Top 2% | Bottom 10% |
| Tenth | Current Condition | Snow | Recession | Bear Market | Record Gas Prices | Lung Adenocarcinoma |

SECURE INTELLIGENT NETWORKED ARCHITECTURE, PROCESSING AND EXECUTION

CROSS REFERENCE TO RELATED APPLICATION

This patent application is a continuation of U.S. patent application Ser. No. 16/517,418 filed Jul. 19, 2019, titled "Secure Intelligent Networked Architecture, Processing and Execution," which is a continuation of U.S. patent application Ser. No. 15/201,005, filed Jul. 1, 2016, titled "Secure Intelligent Networked Architecture, Processing and Execution." The aforementioned disclosures are hereby incorporated by reference herein by its entirety including all references cited therein.

FIELD OF THE TECHNOLOGY

The embodiments disclosed herein are related to secure intelligent networked architecture, processing and execution.

SUMMARY

Provided herein are exemplary systems and methods for secure intelligent networked architecture, processing and execution.

Exemplary embodiments include an intelligent networked architecture comprising an intelligent agent having a specialized hardware processor, the intelligent agent configured to automatically determine a first, a second, a third, a fourth, a fifth, a sixth, a seventh and an eighth digital data element; a secure cloud of a plurality of specialized intelligent historical agents, each historical agent having a specialized hardware processor and a memory further comprising secure digital data corresponding to the first, the second, the third and the fourth digital data elements; a plurality of secure cloud based specialized insight servers, each insight server having a specialized hardware processor, the plurality of secure cloud based specialized insight servers configured to receive from the secure cloud of the plurality of specialized historical agents the secure digital data corresponding to the first, the second, the third and the fourth digital data elements and configured to transform the secure digital data corresponding to the first, the second, the third and the fourth digital data elements as directed by the fifth, the sixth, the seventh and the eighth digital data elements into a scrubbed situational deployment trigger; and an intelligent operational agent having a specialized hardware processor, the intelligent operational agent configured to receive the scrubbed situational deployment trigger.

Further exemplary embodiments include the intelligent operational agent configured to determine a tenth digital element, and configured to deploy the scrubbed situational deployment trigger based on the tenth digital element. The intelligent networked architecture may further comprise a load balancer having a specialized hardware processor, the load balancer configured to distribute the secure digital data received by the plurality of secure cloud based specialized insight servers. The load balancer may be further configured to distribute processing of the secure digital data by the plurality of secure cloud based specialized insight servers.

Some exemplary embodiments include the first digital data element, the second digital data element, and the third digital data element randomly generated by a hardware based random number generator.

BRIEF DESCRIPTION OF THE DRAWINGS

FIG. 3 is a table of exemplary digital data elements for secure intelligent networked architecture, processing and execution.

DETAILED DESCRIPTION OF EXEMPLARY EMBODIMENTS

Figure 1:
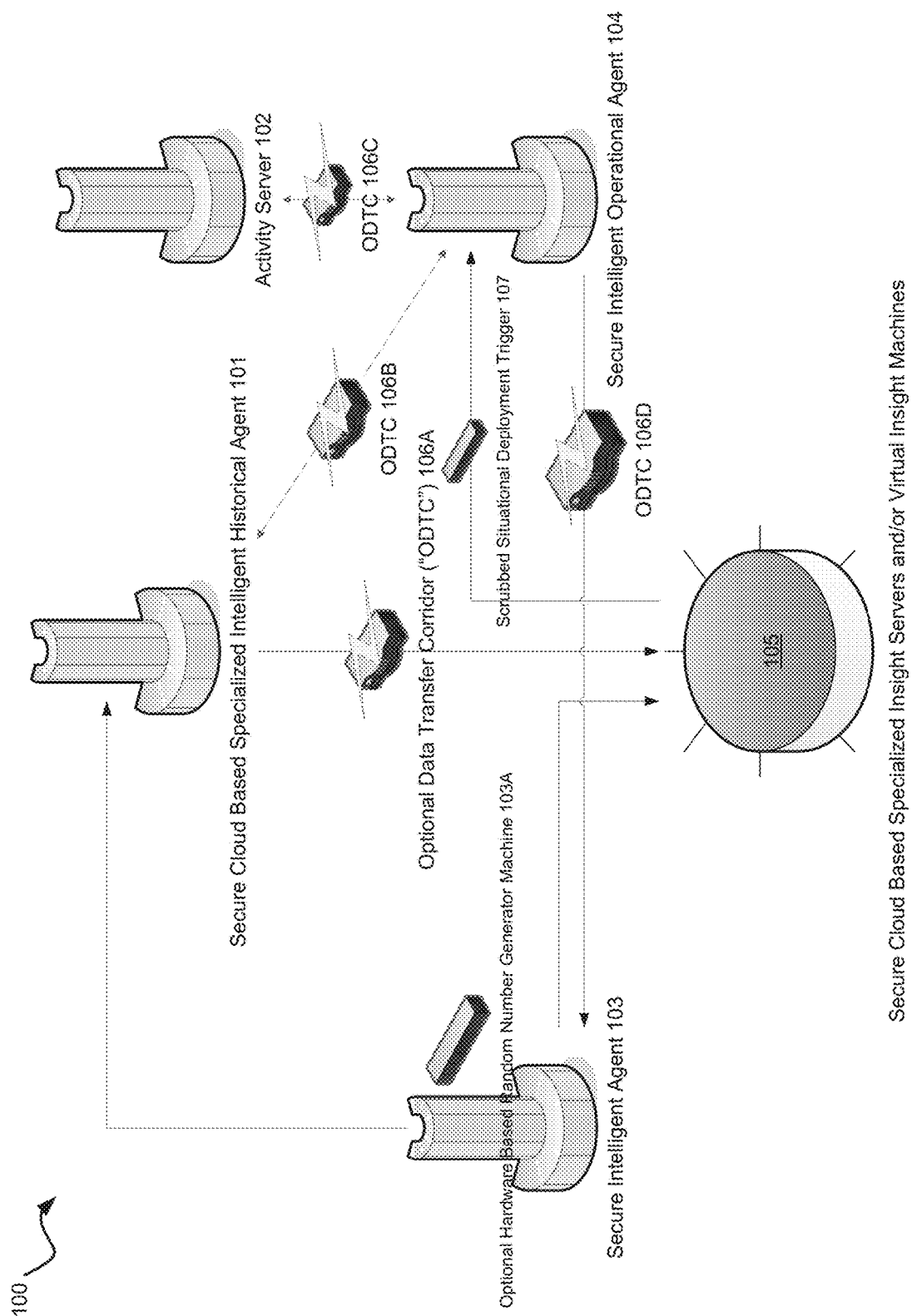
FIG. 1 is a diagram of an exemplary system for secure intelligent networked architecture, processing and execution.

FIG. 1 is a diagram of an exemplary system for secure intelligent networked architecture, processing and execution.

The exemplary system 100 as shown in FIG. 1 includes a secure cloud based specialized intelligent historical agent 101, activity server 102, secure intelligent agent 103, optional hardware based random number generator machine 103A, secure intelligent operational agent 104, secure cloud based specialized insight servers and/or virtual insight machines 105, optional data transfer corridors 106A-106D, and scrubbed situational deployment trigger 107.

According to various exemplary embodiments, the secure cloud based specialized intelligent historical agent 101 is a non-generic computing device comprising non-generic computing components. It may comprise specialized dedicated processors configured to seek, copy and transmit massive amounts of secure digital data from the secure cloud based specialized intelligent historical agent 101 to the secure cloud based specialized insight servers and/or virtual insight machines 105.

In some embodiments, the secure cloud based specialized intelligent historical agent 101 is situated behind a firewall (not shown). In some embodiments, the secure cloud based specialized intelligent historical agent 101 encrypts the secure digital data before storing it and decrypts the secure digital data before copying and transmitting it to the secure cloud based specialized insight servers and/or virtual insight machines 105. The decrypting may be performed as a separate step in advance of copying and transmitting to increase the speed in which the specialized dedicated processors may copy and transmit the secure digital data. According to further embodiments, the specialized dedicated processors may copy as a separate step the secure digital data before transmitting it to increase the speed in which the specialized dedicated processors retrieve and transmit the secure digital data. In even further embodiments, the secure cloud based specialized intelligent historical agent 101 may, without human involvement, automatically search, retrieve, and encrypt new data to update stored secure digital data.

The activity server 102, according to exemplary embodiments, is a third party server with activity influenced by numerous external agents, factors and conditions. The activity server 102 receives secure instructions from the secure intelligent operational agent 104 and the activity server 102 transmits digital data as influenced by the numerous external agents, factors and conditions to the secure intelligent operational agent 104. In some exemplary embodiments, the activity server 102 is associated with one or more sports teams, companies, markets, exchanges, firms or associations. In further exemplary embodiments, one way or two way communication between the activity server 102 and the secure intelligent operational agent 104 may be over a dedicated secure wired channel or over a dedicated secured wireless channel, with or without encryption/decryption and with or without a firewall separating the two.

The secure intelligent agent 103, according to some exemplary embodiments (although not limited to), is a non-generic computing device comprising non-generic computing components. It may comprise specialized dedicated hardware processors to determine and transmit digital data elements to the secure cloud based specialized intelligent historical agent 101. In further exemplary embodiments, the secure intelligent agent 103 comprises a specialized device having circuitry, load balancing, and specialized hardware processors, and artificial intelligence, including machine learning. Numerous determination steps by the secure intelligent agent 103 as described herein may be made by an automatic machine determination without human involvement, including being based on a previous outcome or feedback (e.g. an automatic feedback loop) provided by the secure intelligent networked architecture, processing and/or execution as described herein.

The optional hardware based random number generator machine 103A, according to various exemplary embodiments, may determine and/or transmit one or more digital data elements to the secure intelligent agent 103, to the secure cloud based specialized intelligent historical agent 101 and/or to the secure cloud based specialized insight servers and/or virtual insight machines 105.

The secure intelligent operational agent 104, according to various exemplary embodiments, is a non-generic computing device comprising non-generic computing components. It may comprise specialized dedicated hardware processors to determine and transmit one or more digital data elements to the secure cloud based specialized intelligent historical agent 101. The secure intelligent operational agent 104 may comprise specialized dedicated hardware processors to determine and transmit new data to update secure digital data in the secure cloud based specialized intelligent historical agent 101. The secure intelligent operational agent 104 may comprise specialized dedicated hardware processors to determine, request and receive secure digital data from the secure cloud based specialized intelligent historical agent 101. The secure intelligent operational agent 104 may comprise specialized dedicated hardware processors to determine and transmit secure instructions to the activity server 102. The secure intelligent operational agent 104, may comprise specialized dedicated hardware processors to receive from the activity server 102 digital data as influenced by the numerous external agents, factors and conditions. The secure intelligent operational agent 104 may comprise specialized dedicated hardware processors to receive transformed data, files, and/or visually perceptible elements from the secure cloud based specialized insight servers and/or virtual insight machines 105. The secure intelligent operational agent 104 may comprise specialized dedicated hardware processors to determine and transmit feedback information to the secure intelligent agent 103.

Additionally, the functions of the specialized dedicated hardware processors of the secure intelligent operational agent 104 may be distributed among many hardware processors or integrated or consolidated into fewer hardware processors.

The secure intelligent operational agent 104, in some exemplary embodiments, receives massive amounts of secure digital data from the secure cloud based specialized intelligent historical agent 101 in an extremely short period of time. Such secure digital data may be received by the secure intelligent operational agent 104 as triggered by the secure intelligent operational agent 104 determining a digital data element, determining a list based upon the determined digital data element and requesting members of the list (comprising secure digital data) from the secure cloud based specialized intelligent historical agent 101. Accordingly, bandwidth and processing between the secure intelligent operational agent 104 and the secure cloud based specialized intelligent historical agent 101 may be optimized through dedicated hardware, including processors, wired and/or wireless channels, circuits, switches, firewalls, data compressors, data scrubbers and the like.

The data transmissions to and from the secure intelligent operational agent 104, according to various exemplary embodiments, are highly valuable and/or sensitive. Accordingly, numerous measures may be taken including use of hardware based encryption and/or decryption of the transmissions, use of a dedicated wired and/or wireless channels for transmissions, use of specialized hardware circuitry and/or switches for transmissions.

In a further exemplary embodiment, the data transmissions to and from the secure intelligent operational agent 104 may comprise actual or true transmissions and decoy or false transmissions to deter or throw-off any outside agency intercepting, recording, observing or otherwise interfering with such transmissions.

The secure cloud based specialized insight servers and/or virtual insight machines 105, according to various exemplary embodiments, receive secure digital data from the secure cloud based specialized intelligent historical agent 101. The secure cloud based specialized insight servers and/or virtual insight machines 105, according to various exemplary embodiments, receive at least one digital data element from the secure intelligent agent 103. The secure cloud based specialized insight servers and/or virtual insight machines 105, according to various exemplary embodiments, utilize massive sophisticated computing resources as described herein to produce transformed digital data, files, scrubbed files and/or visually perceptible digital data elements. One such transformation product produced is the scrubbed situational deployment trigger 107 that is transmitted to the secure intelligent operational agent 104.

In certain exemplary embodiments, the secure cloud based specialized insight servers and/or virtual insight machines 105 further comprise a master virtual machine server including a single secure cloud resource responsible for generating all of or most of the herein described virtual machines.

According to various exemplary embodiments, a virtual machine may comprise an emulation of a particular computer system. Virtual machines operate based on the computer architecture and functions of a real or hypothetical computer, and their implementations may involve specialized hardware, software, or a combination of both.

In further exemplary embodiments, a CloudManager is configured to a cluster of cloud computing instances for processing large amounts of data. The CloudManager serves as the user interface to handle the ordering and cancelling of virtual computing instances. Additionally, the CloudManager may allow for detailed customization of the virtual machines. For example, Random Access Memory ("RAM"), processor speed, number of processors, network details, security/encryption, and/or memory may be detailed for each virtual machine and/or all virtual machines. Once the cluster of cloud computing instances is ordered and running, the CloudManager is "listening" for idle machines and "assigning" any idle machine processing responsibilities.

A cloud-based computing environment is a resource that typically combines the computational power of a large grouping of processors and/or that combines the storage capacity of a large grouping of computer memories or storage devices.

For example, 150 8-core virtual machines may be utilized to process hundreds of billions of calculations in three to four hours.

Additionally, each virtual machine may transform historical data and performance data into a neural network usable data set. In some exemplary embodiments, a neural network usable data set comprises an aggregation of data points organized into one or more sets.

For example, for a particular time period, such as each day (or each minute, hour, month, year(s), decades, etc.), for any particular item, the historical data and performance data are grouped together as a data set.

According to further embodiments, each virtual machine may create a neural network base. The neural network base, along with the neural network usable data set forms a neural network. Creating a neural network base, according to some exemplary embodiments, includes processing a layer of input data and then processing that data algorithmically to compare the output of algorithms against known output.

A neural network base may comprise a set of algorithms used to approximate against data inputs. These algorithms are able to store tested values within itself and store an error rate.

A neural network may comprise a neural network base and its underlying algorithms in tandem with a neural network usable data set. The neural network usable data set may function as a data feeder for the neural network base to calculate and/or otherwise interact with.

In various exemplary embodiments, feeding of a data point may be performed by the neural network iteratively requesting to process the next data point in the usable data set.

Data points, according to many exemplary embodiments, may include but are not limited to performance data and historical data that the neuro network has access to as part of its useable data set.

Also shown in FIG. 1 are optional data transfer corridors 106A-106D. According to further exemplary embodiments, one or more optional data transfer corridors may be installed at certain locations in the intelligent networked architecture. The optional data transfer corridors are hardware-based secure, high speed data transfer corridors, each having specialized processors and switches. The optional data transfer corridors facilitate the unilateral or bilateral transfer of massive amounts of data especially in those situations where the extremely quick transfer of massive amounts of data is required.

Figure 2A:
FIGS. 2A-2B represent a flowchart of an exemplary method for intelligent networked architecture, processing and execution exemplary method for intelligent networked architecture, processing and execution.
Figure 2B:
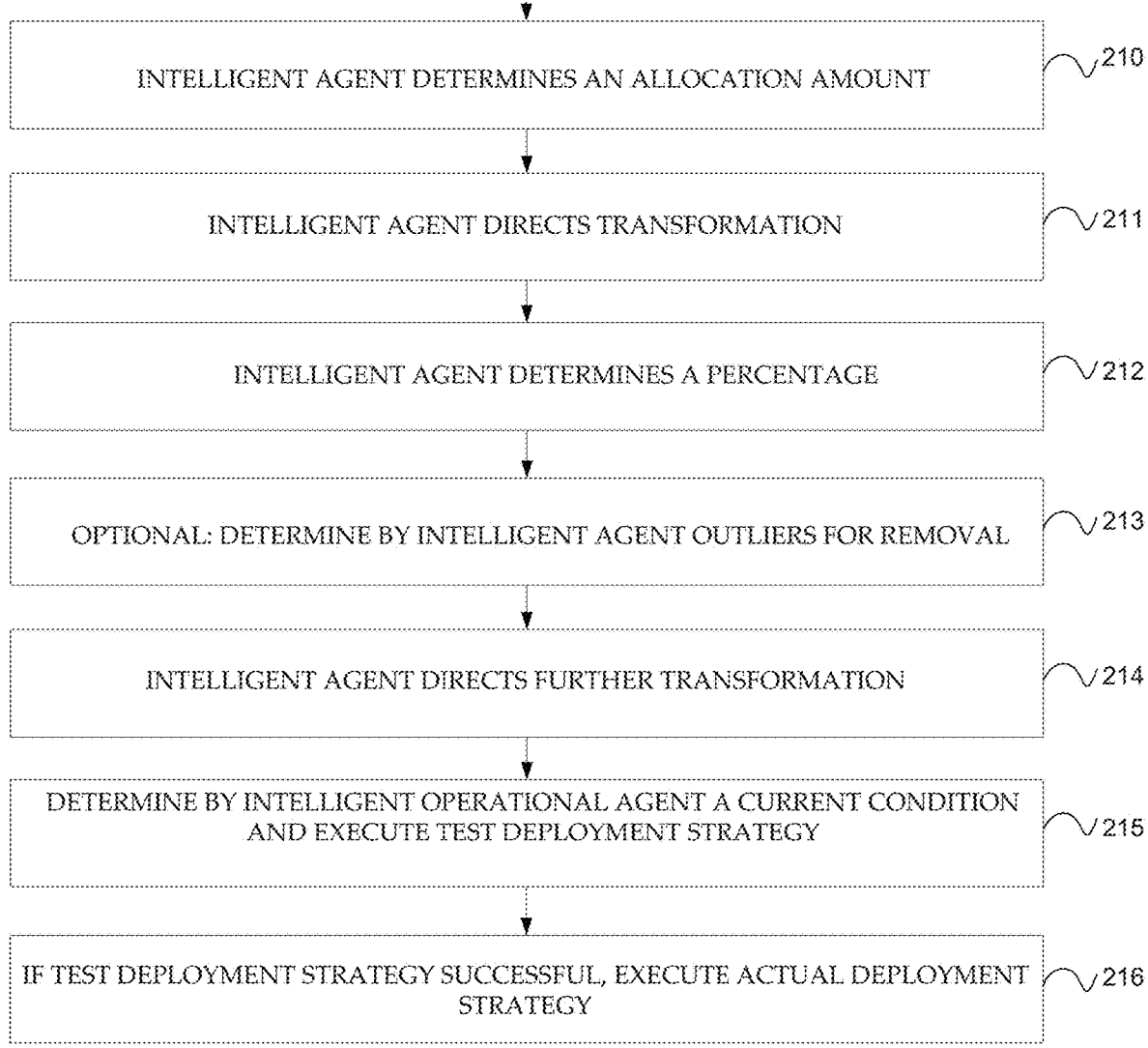

FIGS. 2A-2B represent a flowchart of an exemplary method 200 for intelligent networked architecture, processing and execution.

At step 201, a secure intelligent agent determines a first digital data element. In some exemplary embodiments, the first digital data element may include a resource. In further exemplary embodiments, other factors may represent the first digital data element.

At step 202, the secure intelligent agent determines a second digital data element. In some exemplary embodiments, the second digital data element is a segment for the resource. In further exemplary embodiments, other factors may represent the second digital data element.

At step 203, the secure intelligent agent determines a third digital data element. In various exemplary embodiments, the third digital data element is an item on the determined segment. In further exemplary embodiments, other factors may represent the third digital data element.

At optional step 204, steps 201 through 203 (i.e. intelligent determination of the first, second and/or third digital data elements) may be performed by a hardware based random number generator machine that comprises part of the intelligent agent.

Optional step 204, according to many exemplary embodiments, improves the functioning of the exemplary system by optimizing the number of runs that can be performed in a limited period of time. That is, in most exemplary embodiments, the information generated has a time value. As time lapses, the value of the information decreases. Additionally, given the massive amount of data to be processed in a limited period of time, it is important that the time be used as effectively as possible. Therefore employing random number generation to drive the variables for the runs is far more effective than having a human drive the variables for the runs, as human involvement would likely lead to redundancy, bias and other inefficiencies, as often a desired goal is to maximize the number of runs that may be performed in a limited period of time.

At step 205, the intelligent agent accesses (via its circuitry over a secure network to a secure cloud of specialized intelligent historical agents and/or virtual intelligent historical agents that may be load balanced) secure digital data for the first, second and third digital data elements.

At step 206, the intelligent agent determines a fourth digital data element. In some exemplary embodiments, the fourth digital data element is a look back period. In further exemplary embodiments, other factors may represent the fourth digital data element. This step may also be performed by the hardware based random number generator machine, either as a separate step or as part of optional step 204.

At step 207, the intelligent agent directs (via its circuitry over a secure network) the secure cloud of specialized intelligent historical agents and/or virtual intelligent historical agents that may be load balanced to send secure digital data for the first, second, third and fourth digital data elements to a plurality of secure cloud based specialized insight servers and/or virtual insight machines. In some embodiments, security of such activity may be established through a virtual private network ("VPN").

According to many exemplary embodiments, the secure cloud of specialized intelligent historical agents and/or virtual intelligent historical agents function in parallel to divide the data to be transferred to the plurality of cloud based specialized insight servers and/or virtual insight machines, copy the secure digital data, proportion the copied secure digital data among a series of secure channels and transmit the data to the plurality of specialized insight servers and/or virtual insight machines.

At step 208, the intelligent agent determines a fifth digital data element. According to various exemplary embodiments, a performance metric is the fifth digital data element. In further exemplary embodiments, other factors may represent the fifth digital data element. This step may also be performed by the hardware based random number generator machine, either as a separate step or as part of optional step 204.

At step 209, the intelligent agent determines a sixth digital data element. According to various exemplary embodiments, a condition is the sixth digital data element. In further exemplary embodiments, other factors may represent the sixth digital data element. This step may also be performed by the hardware based random number generator machine, either as a separate step or as part of optional step 204.

At step 210, the intelligent agent determines a seventh digital data element. According to various exemplary embodiments, an allocation amount is the seventh digital data element. In further exemplary embodiments, other factors may represent the seventh digital data element.

At step 211, the intelligent agent directs (via its circuitry over a secure network) the secure cloud of specialized insight servers and/or virtual insight machines to transform the secure digital data for the first, second, third and fourth digital data elements pursuant to the fifth, sixth and seventh digital data elements.

According to many exemplary embodiments, data transformation is optimized by one way secure digital data delivery across expandable computing resources. This includes not transmitting back the secure digital data for the first through seventh digital data elements to their origins. Instead, the fast destruction of this data is performed so as to speed up the transformation of a subsequent run.

At step 212, the intelligent agent determines an eighth digital data element. According to one exemplary embodiment, a percentage representing a percentage of the transformed results that should be selected is the eighth digital data element. In further exemplary embodiments, other factors may represent the eighth digital data element.

At optional step 213, the intelligent agent determines a ninth digital data element. According to one exemplary embodiment, an upper and/or lower outlier factor, representing a particular percentage of the highest and/or lowest of the transformation results to remove before performing step 212 is the ninth digital data element.

At step 214, the intelligent agent directs (via its circuitry over a secure network) the secure cloud of specialized insight servers and/or virtual insight machines to further transform the transformation results generated at step 211 pursuant to step 212 and optionally, step 213. According to one exemplary embodiment, the further transformation results in a list of names and/or identifiers of portions of the transformed results, but not the portions themselves.

In many exemplary embodiments, the transformation results generated at step 211 pursuant to step 212 and optionally, step 213 represent a massive amount of data. At step 214, computing performance is improved by scrubbing or clearing the data transferred from the secure cloud of specialized intelligent historical agents and/or virtual intelligent historical agents from names and/or identifiers of parts of that data. The names and/or identifiers are based on the output or outcome of the transformation performed at step 211 pursuant to step 212 and optionally, step 213. The amount of data represented by the names and/or identifiers is extremely small when compared to the secure digital data transferred from the secure cloud of specialized historical agents and/or virtual historical intelligent agents. Because the data transferred from the secure cloud of specialized intelligent historical agents and/or virtual intelligent historical agents was copied before the transmission, this data still resides in the secure cloud of specialized intelligent historical agents and/or virtual intelligent historical agents. The scrubbed names and/or identifiers is transformed into a list that may also include specification of digital data elements one through eight. The list is then securely transmitted to an intelligent operational agent.

The functioning of the intelligent operational agent, according to various exemplary embodiments, is enhanced by being focused on matching strategies to current conditions by being focused on such and not being hindered by having to consume time and resources in managing and processing the corresponding secure digital data that resides in the secure cloud of specialized intelligent historical agents and/or virtual intelligent historical agents. In comparison to systems to where both data sets reside in the same machine, the intelligent operational agent can more quickly match a strategy to a current condition and make a deployment.

According to further exemplary embodiments, a scrubbed situational deployment trigger such as exemplary scrubbed situational deployment trigger 107 (FIG. 1) is the transformed product produced at step 214. As described herein, most if not all of the secure digital data employed to generate the scrubbed situational deployment trigger 107 has been scrubbed by the clearing of the secure digital data from the secure cloud based specialized insight servers and/or the virtual insight machines 105 (FIG. 1). The scrubbed situational deployment trigger 107 comprises the names/identifiers of strategies determined at step 214 so that the strategies may be quickly recalled from the secure cloud based specialized intelligent historical agent 101 (FIG. 1) upon the occurrence of a particular current condition. In many exemplary embodiments, the scrubbed situational deployment trigger 107 also comprises digital data elements one through nine. After it is generated, the scrubbed situational deployment trigger 107 is transmitted from the secure cloud based specialized insight servers and/or the virtual insight machines 105 to the secure intelligent operational agent 104. As described in connection with step 215, upon the occurrence of a particular current condition (e.g. the tenth digital data element) that is the same as or approximates the condition for which the scrubbed situational deployment trigger 107 was produced (e.g. the six digital data element), the scrubbed situational deployment trigger 107 will cause the transmission of the named/identified strategies from the secure cloud based specialized intelligent historical agent 101 for execution at the activity server 102 (FIG. 1).

At step 215 the intelligent operational agent determines a tenth digital data element and executes a test deployment strategy.

According to various exemplary embodiments, the tenth digital data element is a current condition. In some embodiments, the current condition may be similar to the sixth digital data element, a condition. Accordingly, the intelligent operational agent may access the list of names and/or identifiers corresponding to the sixth digital data element. Upon receiving a request from the intelligent operational agent, the secure cloud of specialized intelligent historical agents and/or virtual historical intelligent agents will function in parallel to send the secure digital data to the intelligent operational agent. The intelligent operational agent will then test deploy the transferred data in a setting such as that exemplified by the activity server 102 (FIG. 1).

According to further exemplary embodiments, the intelligent operational agent may transmit to the activity server one or more decoy strings in the same string to confuse any unwanted hackers attempting to intercept such information. The activity server would only actually deploy the actual strategy.

At step 216, if the test deployment strategy performed at step 215 was successful, the intelligent operational agent will actually execute the deployment strategy.

FIG. 3 is a table of exemplary digital data elements for secure intelligent networked architecture, processing and execution.

Shown in table 300 of FIG. 3 are ten exemplary digital data elements, including the corresponding name of each of the digital data elements. The first digital data element is a resource. Resources may include football players, workers, equities, vehicles, biological based drugs and the like. The second digital data element is a resource segment. Resource segments may include college football, lawyers, New York Stock Exchange ("NYSE"), trucks, monoclonal antibodies ("Mabs") and such. The third digital data element is an item. Items may include running backs, patent lawyers, GM stock, Ford trucks, cancer Mabs, etc. The fourth digital data element is a look back period. Look back periods may include without limitation the last two seasons, last month, last ten years, last thirty years, last two years, or last 5000 patients, etc. The fifth digital data element is a performance metric. Performance metrics may include, without limitation, yards per carry, hours billed, risk adjusted performance, miles per gallon, disease free months. The sixth digital data element is a condition. Conditions may include, without limitation, snow, recession, bear market, record (high or low) gas prices, lung adenocarcinoma, or a drought. The seventh digital data element is an allocation amount. Allocation amounts may include, without limitation, number of players, workers, dollars, vehicles, drugs, computing resources or contracts. The eighth digital data element is a percentage for selection. Percentages for selection may include, without limitation, top 10%, top 2%, top 1%, top 4%, or top 30%. The ninth digital data element is an outlier percentage to remove from a top and/or bottom of a data set before executing selection pursuant to the eighth digital data element. Outlier percentages may include, without limitation, top 1% and bottom 1%, top 5% and bottom 1%, not applicable or doesn't apply ("N/A"), top 2% or bottom 10%. The tenth digital data element is a current condition. Current conditions may include, without limitation, snow, recession, bear market, record (high or low) gas prices, lung adenocarcinoma, or a drought.

Figure 4A:
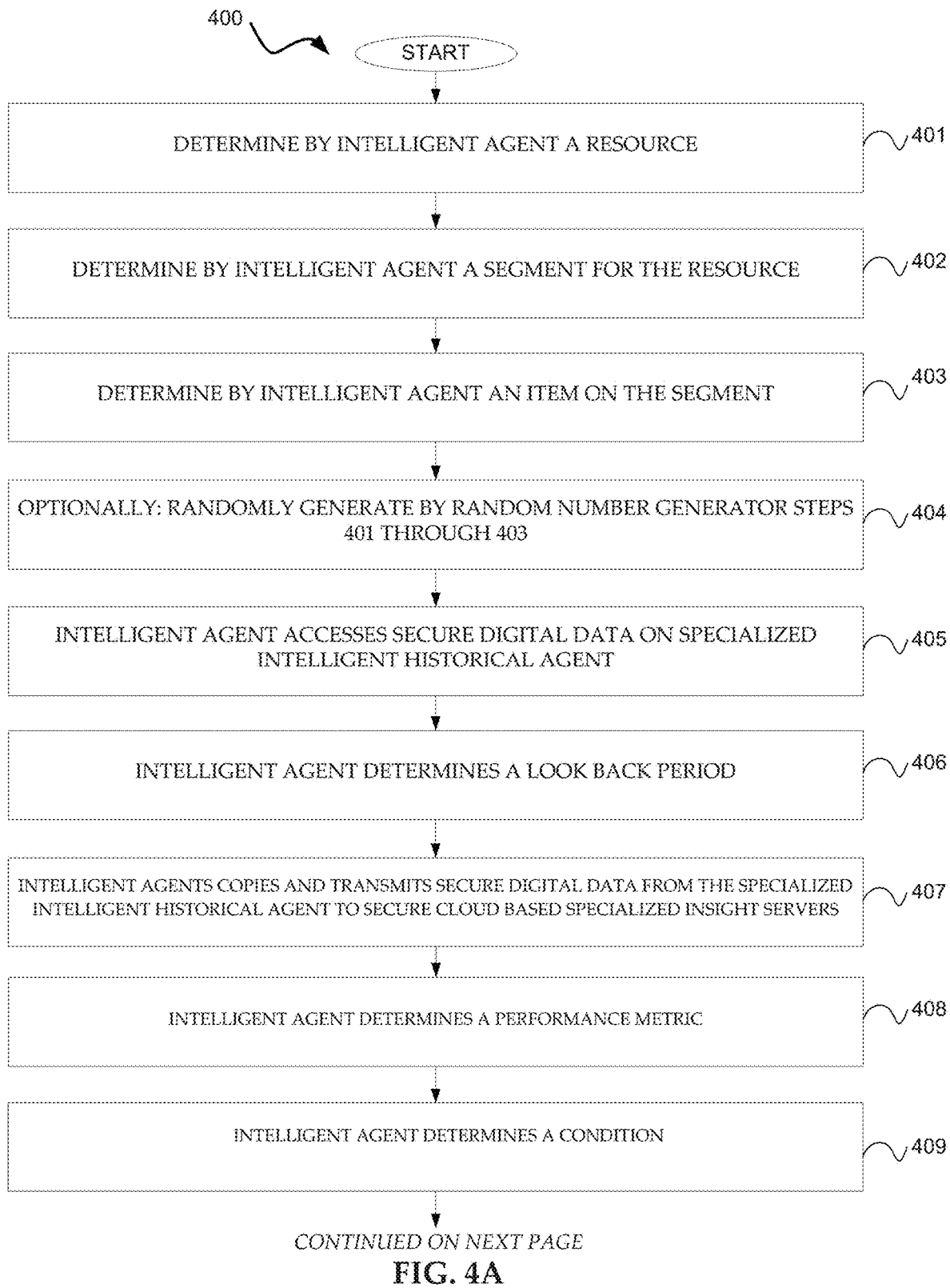
FIGS. 4A-4B represent a flowchart of an exemplary method for intelligent networked architecture, processing and execution.
Figure 4B:
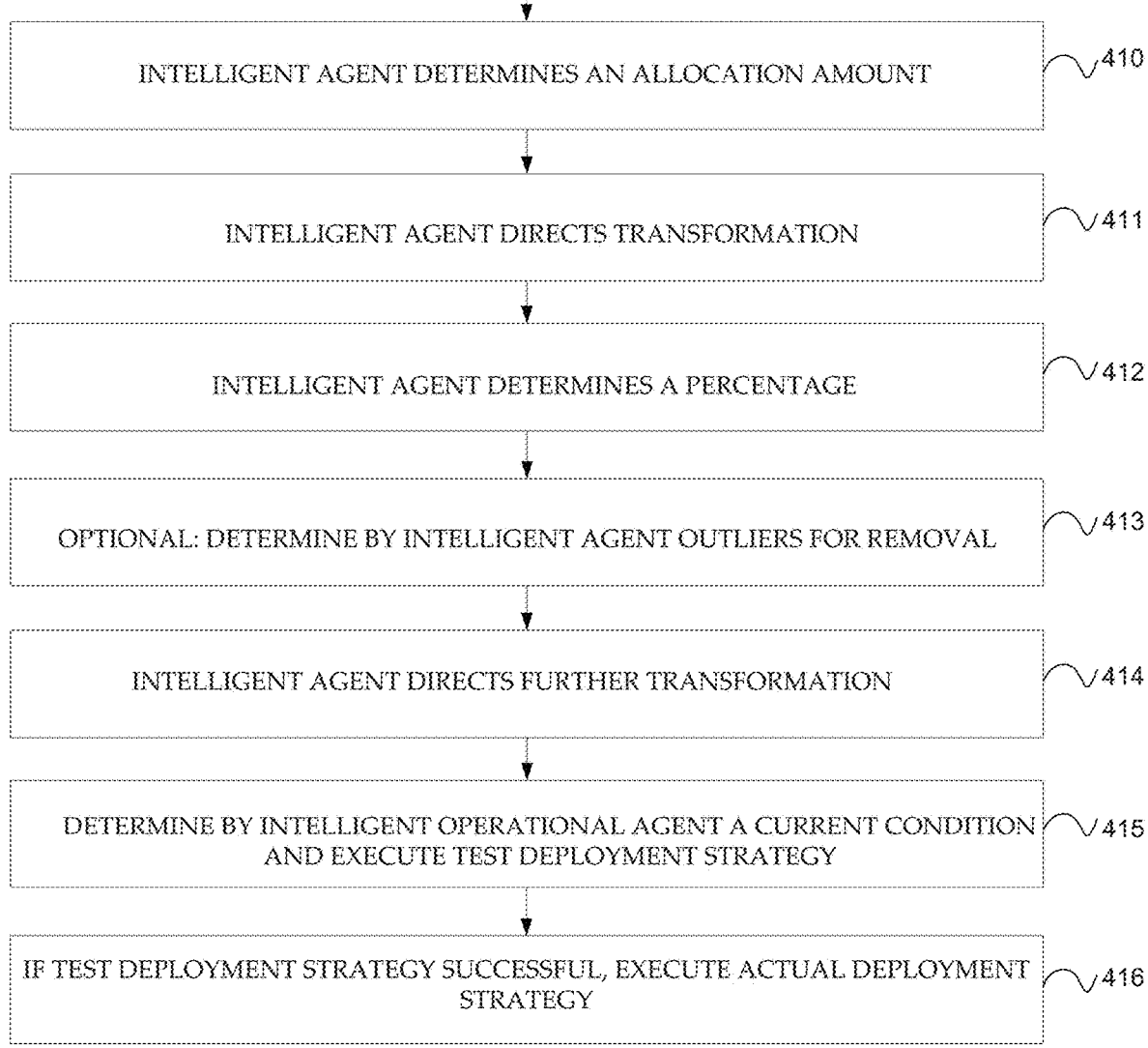

FIGS. 4A-4B represent one example of the application of intelligent networked architecture, processing and execution shown in exemplary method 400.

At step 401, a secure intelligent agent determines a first digital data element. In some exemplary embodiments, the first digital data element may include a resource. For example, resources may include metals, energies, currencies, softs, grains, meats, and interest rates.

Here, for example, equities may be selected as the first digital data element.

At step 402, the secure intelligent agent determines a second digital data element. In some exemplary embodiments, the second digital data element is a segment for the resource. For example, segments may include the Chicago Mercantile Exchange ("CME"), New York Mercantile Exchange ("NYMEX") and/or the Intercontinental Exchange ("ICE").

Here, for example, the New York Stock Exchange ("NYSE") may be selected as the second digital data element.

At step 403, the secure intelligent agent determines a third digital data element. In various exemplary embodiments, the third digital data element is an item on the determined segment. For example, items may include gold ("GC"), crude oil ("CL"), and/or the S&P 500 ("ES").

Here, for example, General Motors ("GM") stock may be selected as the third digital data element.

At optional step 404, steps 401 through 403 (i.e. intelligent determination of the first, second and/or third digital data elements) may be performed by a hardware based random number generator machine that comprises part of the intelligent agent.

At step 405, the intelligent agent accesses (via its circuitry over a secure network to a secure cloud of specialized intelligent historical agents and/or virtual intelligent historical agents that may be load balanced) secure digital data for the first, second and third digital data elements. For example, the secure digital data for the first, second and third digital data elements may be trading strategies, including algorithms or bots.

According to some exemplary embodiments, data processing may be managed using simultaneous requests without the need to have multiple copies of programs executing within any single intelligent agent (e.g. "multithreading").

Here, for example, an entire population (or optionally a segment of the entire population) of algorithms or bots that trade GM stock on the NYSE market is the secure digital data. For example, data for 160,000 bots (or more) are selected. These bots may be generated per U.S. Non Provisional application Ser. No. 14/642,569 filed on Mar. 9, 2015 titled "Systems and Methods for Generating and Selecting Trading Algorithms for Big Data Trading in Financial Markets," which is hereby incorporated by reference, or the bots may be generated by other systems and methods.

According to certain exemplary embodiments, a trading algorithm, a trading strategy or a bot comprises a technical indicator, an evaluation bar characteristic and an item.

A technical indicator at the most basic level is a series of data points that are derived by applying a formula to price data of an item. Technical indicators provide a unique perspective on the strength and direction of the underlying price action of the item. Exemplary technical indicators include, but not by way of limitation, relative strength index ("RSI"), average directional index, stochastics, money flow index, moving average convergence-divergence, etc.

A bar is comprised of an opening price, a closing price, intervening prices, volume and trading activity across a period of time for an item. For example, the price of gold may open at $800 per ounce on an exchange at 9:00 AM and close at $900 per ounce on the same exchange at 5:00 PM on the same day. This may represent one bar.

Evaluation bar characteristics may be based on time, tick, volume, or market activity. For example, time (e.g., second, minute, hour, day, month etc.), and/or tick (trades at the exchange, e.g., x number of trades) and/or volume (e.g., one, ten, two-hundred, one-thousand etc. contracts), and/or market-activity (e.g., 0.5%, 1%, 1.5%, 2% etc. market move).

Items may include futures (e.g., S&P, Euro, gold, crude, cotton, soybeans, 10-yr notes, lean hogs, etc.), stocks (e.g., PG, GE, AAPL, GOOG, FB, etc.), bonds (e.g., US Gov. bonds, Eurodollar, etc.), and forex (e.g., EURUSD euro to the dollar, etc.).

Here, for example, the relative strength index ("RSI") may be selected as a technical indicator. Every thirty seconds may be selected as an evaluation bar characteristic. The price of gold may be selected as the tradable item. Accordingly, a bot may comprise deciding whether to buy, sell or hold based on calculating the RSI of the price of gold every 31 seconds while the relevant market is open.

A secure cloud of specialized historical intelligent historical agents and/or virtual intelligent historical agents, according to some exemplary embodiments, may comprise trading algorithms, trading strategies or "bots" that meet minimum standards.

In some embodiments, minimum standards refer to anything that is trade worthy. Minimum standards vary for different preliminary tests. For example, if the strategy is to look for safe trading algorithms, filtering criteria focus on safety (minimal losses) in unfavorable market conditions such as volatile or bearish market periods. If the strategy is to look for high performing trading algorithms, filtering criteria focus on superior returns such as any trading algorithm with a high annual return (i.e., greater than 50% return).

At step 406, the intelligent agent determines a fourth digital data element. In some exemplary embodiments, the fourth digital data element is a look back period. In further exemplary embodiments, other factors may represent the fourth digital data element. This step may also be performed by the hardware based random number generation machine, either as a separate step or as part of optional step 404. Here, for example, the intelligent agent may determine a look back period of 10 years as the fourth digital data element.

At step 407, the intelligent agent directs (via its circuitry over a secure network) the secure cloud of specialized intelligent historical agents and/or virtual intelligent historical agents that may be load balanced to send secure digital data for the first, second, third and fourth digital data elements to a plurality of secure cloud based specialized insight servers and/or virtual insight machines. In some embodiments, security of such activity may be established through a virtual private network ("VPN").

Here, for example, the past 10 years of transaction data (on a transaction by transaction basis) for each of the bots that trade GM as well as the past 10 years of market price data (on a minute by minute basis) is the secure digital data for the first, second, third and fourth digital data elements that the intelligent agent determines and directs the transmission between cloud resources.

Here, for example, transaction information for the 160,000 bots and copies of the bots are transmitted. Load balancing of the servers may also be performed as directed by the intelligent agent or another specialized machine.

At step 408, the intelligent agent determines a fifth digital data element. According to various exemplary embodiments, a performance metric is the fifth digital data element. This step may also be performed by the hardware based random number generation machine, either as a separate step or as part of optional step 404. Here, for example, risk adjusted performance is determined by the intelligent agent as the fifth digital data element.

According to some exemplary embodiments, bots or trading algorithms may be grouped together in each market by each performance metric. A group of bots filtered by average drawdown is focused on risk/safety. A group of bots filtered by MAR is focused on risk-adjusted returns since risk now taken into account (unlike CAGR).

According to other exemplary embodiments, multiple performance metrics may be selected at step 408. Such performance metrics may include, however, not limited to: Compounded Annual Growth Rate (CAGR), Time Weighted Rate of Return (TWRR), Holding Period Return (HPR), Jenson's Alpha, Underwater Volume Index (UVI), Abovewater Volume Index (AVI), Average Drawdown, Maximum Drawdown, MAR Ratio, Total Decision Points, Trades Per Million, Best 12 Months, Worst 12 Months, Return Retracement Ratio, Sortino Ratio, Sharpe Ratio, Percent in the Market, Total Number of Trades, Average Trade Length, Average Trades Per Day, Average Trades Per Week, Average Trades Per Month, Percent Return in the Last Week, Percent Return in the Last 4 Weeks, Number of trades in the Last Week, Number of trades in the Last 4 Weeks, Commission, Slippage, Time Spent Long in the Market, Time Spent Short in the Market, Average Profit/Loss per Day, Average Profit/Loss per Week, Average Profit/Loss per Month, K-Ratio, and/or RINA Index.

At step 409, the intelligent agent determines a sixth digital data element. According to various exemplary embodiments, a condition is the sixth digital data element. In further exemplary embodiments, other factors may represent the sixth digital data element. This step may also be performed by the hardware based random number generation machine, either as a separate step or as part of optional step 404. Here, for example, a bear market condition may be selected as the sixth digital data element, so that the risk adjusted performance for each of the bots trading GM stock is calculated for the bear markets that took place during the last 10 years. According to other exemplary embodiments, market conditions may also include cyclical bull, cyclical bear, volatile and/or ranging.

At step 410, the intelligent agent determines a seventh digital data element. According to various exemplary embodiments, an allocation amount is the seventh digital data element. In further exemplary embodiments, other factors may represent the seventh digital data element. Here, the allocation amount is a number of contracts to deploy.

According to other exemplary embodiments, the allocation amount may be to a single strategy, a group of strategies, and/or to multiple groups of strategies. For example, the maximum number of contracts a grouping of strategies will trade may be set and the grouping of strategies will systematically trade based on the strategies' signals. In another example, a fixed percentage of total equity or total value may represent an allocation amount. Accordingly, with a $1,000,000 total value, the maximum number contracts may be set so that the margin to equity ratio is 10%. The maximum number of contracts traded will change as the equity changes and as the margin on a given contract adjusts. In another example, risk based allocation may be used. Here, based on a risk metric, contracts are allocated to the best risk-return ratio in real time. In yet a further example, a machine learning algorithm allocation may be used. In this case, based on the machine learning algorithm, contract allocation will be distributed to the highest expectancy score.

At step 411, the intelligent agent directs (via its circuitry over a secure network) the secure cloud of specialized insight servers and/or virtual insight machines to transform the secure digital data for the first, second, third and fourth digital data elements pursuant to the fifth, sixth and seventh digital data elements. In one exemplary embodiment, the transformation will result in visually perceptible elements. In further exemplary embodiments, other factors may represent the transformation result.

Here, for example, visually perceptible elements may represent performance of the 160,000 bots based upon the determined performance metric and market condition. For example, based upon the past transaction history for each bot on a minute by minute basis, a visually perceptible element representing the risk adjusted performance for each of the bots trading GM stock is calculated for the bear markets that took place during the last 10 years.

Here, for example, if a bot made 20 transactions over the last 10 years, these transactions can be evaluated in order to calculate a performance metric. Other information about the bot may be determined based on observing the bot's minute by minute performance against its transaction history, including trade by trade metrics, compound annual growth rate (CAGR), underwater volume index (UVI), drawdown evaluation metrics, etc.

Performance metrics may include total profit over 1 year, percentage of profitable trades over a time period, how much was gained or lost in each trade, percentage of profitable trades in a bear or bull market, correlation to other indexes, ratio of profitable trades to cover largest loss, etc. For instance, % of profitable trades (=profitable trades/total number of trades) may be used as performance metrics.

According to other exemplary embodiments, performance metrics may also include maximum drawdown, average drawdown, max peak to trough time, average peak to trough time, max peak to peak time, average peak to peak time, pain to gain ration, sortino ratio, sharpe ratio, and/or return retracement ratio.

At step 412, the intelligent agent determines an eighth digital data element. According to one exemplary embodiment, a percentage representing a percentage of the transformed results that should be selected is the eighth digital data element. According to one exemplary embodiment, a percentage representing what percent of the bot population should be selected for active trading based upon step 411 is the eighth digital data element. Here, for example, for the plurality of specialized servers each having an insight engine, 1% is determined, meaning that the top 1% of the 160,000 bots should be selected based the risk adjusted return for trading GM stock (regardless of frequency) for the bear markets during past 10 years, resulting in a strategic trading portfolio of 1600 selected bots. According to another exemplary embodiment, a predetermined minimum threshold may be set as the eighth digital element. In this case, bots meeting and/or exceeding such a threshold are selected.

At optional step 413, the intelligent agent determines a ninth digital data element. According to one exemplary embodiment, an upper and/or lower outlier factor, representing a particular percentage of the highest and/or lowest of the transformation results to remove before performing step 412 is the ninth digital data element. According to one exemplary embodiment, an upper and/or lower outlier factor, representing a particular percentage of the highest and/or lowest performing bots to remove before performing step 412 is the eighth digital data element. For example, the intelligent agent may employ multiple statistical regression methods to systematically determine which bots perform outside of a mean of a particular population. Such methods may include, but are not limited to grouping methods (e.g. ignoring the top 5% based on the selected performance metric and grouping the first 100 and 300 of the remaining bots), elimination methods (standardization or normalization of populations through elimination of the top and bottom 5% of bots outside of a statistical mean), using statistical measures DFITTS and/or DFBETAS to identify outliers, or mathematical calculations such as standard error and standard deviation. In further exemplary embodiments, other factors may represent the eighth digital data element.

At step 414, the intelligent agent directs (via its circuitry over a secure network) the secure cloud of specialized insight servers and/or virtual insight machines to further transform the transformation results generated at step 411 pursuant to step 412 and optionally, step 413. According to one exemplary embodiment, the further transformation results in a list of names/identifiers of the bots in each strategic trading portfolio (and not the bots themselves). The list may include the variables defined by the intelligent agent during the run as well as the resulting performance metric(s) for each bot and for the strategic trading portfolio. The list may also include a market condition for the strategic trading portfolio. The list may be transmitted to an intelligent operational agent for further analysis.

At step 415 the intelligent operational agent determines a tenth digital data element and executes a test deployment strategy.

According to various exemplary embodiments, the tenth digital data element is a current condition. In some embodiments, the current condition may be similar to the sixth digital data element, a condition. Accordingly, the intelligent operational agent may access the list of names and/or identifiers corresponding to the sixth digital data element. Upon receiving a request from the intelligent operational agent, the secure cloud of specialized intelligent historical agents and/or virtual historical intelligent agents will function in parallel to send the secure digital data to the intelligent operational agent. The intelligent operational agent will then test deploy the transferred data in a setting such as that exemplified by the activity server 102 (FIG. 1).

According to further exemplary embodiments, the intelligent operational agent may transmit to the activity server one or more decoy strings in the same string to confuse any unwanted hackers attempting to intercept such information. The activity server would only actually deploy the actual strategy.

At step 416, if the test deployment strategy performed at step 415 was successful, the intelligent operational agent will actually execute the deployment strategy.

The exemplary systems and methods described herein may be performed in a secure computing environment including the use of firewalls and encryption technology. Given the potentially high value of the information being generated, and the potential magnitude of the resulting investment decisions, measures may be taken to perform some or all of the steps herein in a secure manner, with emphasis on such steps as the determination of strategy and execution of trades. For example, in addition to an optimal strategy, non-optimal strategies may purposely be added in the same string or digital data environment of the optimal strategy to confuse any unwanted hackers intercepting such information. As another example, in addition to a desired trade to be executed, undesired trades may purposely be added in the same string or digital data environment of the desired trade to confuse any unwanted hackers intercepting such information. Further, the desired trade may receive funding for execution, whereas the undesired trades may not receive funding for execution.

Figure 5A:
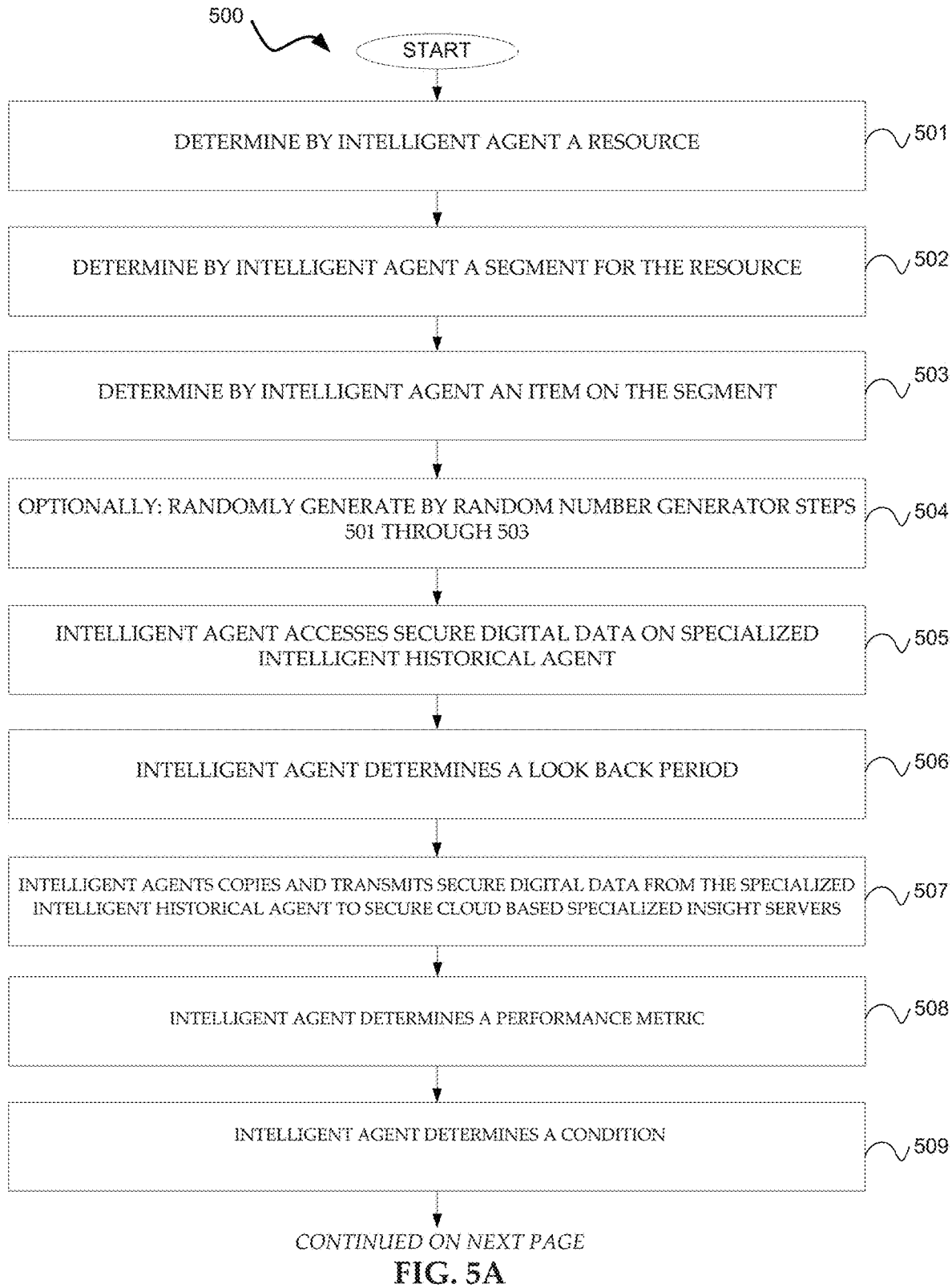
FIGS. 5A-5B represent a flowchart of an exemplary method for intelligent networked architecture, processing and execution.
Figure 5B:
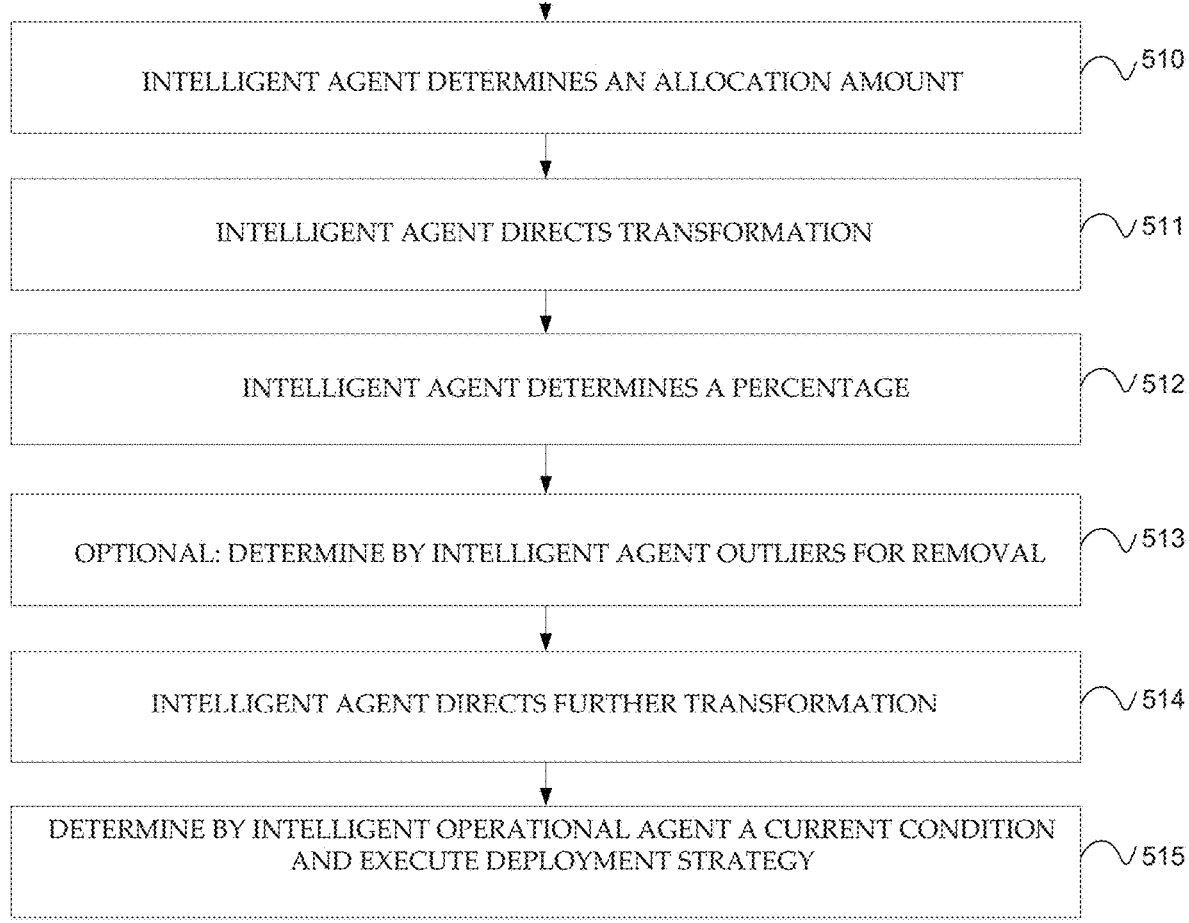

FIGS. 5A-5B represent another example of the application of intelligent networked architecture, processing and execution shown in exemplary method 500.

At step 501, a secure intelligent agent determines a first digital data element. In some exemplary embodiments, the first digital data element may include a resource.

Here, the resource is a large collection of biological drugs.

At step 502, the secure intelligent agent determines a second digital data element. In some exemplary embodiments, the second digital data element is a segment for the resource.

Here, the segment for the resource are monoclonal antibody ("Mab") based biological drugs.

At step 503, the secure intelligent agent determines a third digital data element. In various exemplary embodiments, the third digital data element is an item on the segment.

Here, the item on the segment are monoclonal antibody ("Mab") based drugs for treating cancer.

At optional step 504, steps 501 through 503 (i.e. intelligent determination of the first, second and/or third digital data elements) may be performed by a hardware based random number generator machine that comprises part of the intelligent agent.

Optional step 504, according to many exemplary embodiments, improves the functioning of the exemplary system by optimizing the number of runs that can be performed in a limited period of time. That is, in most exemplary embodiments, the information generated has a time value. As time lapses, the value of the information decreases. Additionally, given the massive amount of data to be processed in a limited period of time, it is important that the time be used as effectively as possible. Therefore employing random number generation to drive the variables for the runs is far more effective than having a human drive the variables for the runs, as human involvement would likely lead to redundancy, bias and other inefficiencies, as often a desired goal is to maximize the number of runs that may be performed in a limited period of time.

At step 505, the intelligent agent accesses (via its circuitry over a secure network to a secure cloud of specialized intelligent historical agents and/or virtual intelligent historical agents) secure digital data for the first, second and third digital data elements.

At step 506, the intelligent agent determines a fourth digital data element. In some exemplary embodiments, the fourth digital data element is a look back period. This step may also be performed by a hardware based random number generation machine, either as a separate step or as part of optional step 504.

Here, the look back period is represented by the last 50,000 patients seen or treated with monoclonal antibody ("Mab") based drugs for cancer.

At step 507, the intelligent agent directs (via its circuitry over a secure network) the secure cloud of specialized intelligent historical agents and/or virtual intelligent historical agents to send secure digital data for the first, second, third and fourth digital data elements to a plurality of secure cloud based specialized insight servers and/or virtual insight machines. In some embodiments, security of such activity may be established through a virtual private network ("VPN").

According to many exemplary embodiments, the secure cloud of specialized intelligent historical agents and/or virtual intelligent historical agents function in parallel to divide the data to be transferred to the plurality of cloud based specialized insight servers and/or virtual insight machines, copy the secure digital data, proportion the copied secure digital data among a series of secure channels and transmit the data to the plurality of specialized insight servers and/or virtual insight machines.

Here, the secure digital data includes the medical histories and genomic data for the last 50,000 patients seen or treated with monoclonal antibody ("Mab") based drugs for cancer.

At step 508, the intelligent agent determines a fifth digital data element. According to various exemplary embodiments, a performance metric is the fifth digital data element. In further exemplary embodiments, other factors may represent the fifth digital data element. This step may also be performed by the hardware based random number generation machine, either as a separate step or as part of optional step 504.

Here, the number of disease free months is the performance metric.

At step 509, the intelligent agent determines a sixth digital data element. According to various exemplary embodiments, a condition is the sixth digital data element. This step may also be performed by the hardware based random number generation machine, either as a separate step or as part of optional step 504.

Here, the condition is adenocarcinoma of the lung, with a particular gene sequence.

At step 510, the intelligent agent determines a seventh digital data element. According to various exemplary embodiments, an allocation amount is the seventh digital data element. In further exemplary embodiments, other factors may represent the seventh digital data element.

Here, the allocation amount is the amount of computing resources that may be used in performing step 511.

At step 511, the intelligent agent directs (via its circuitry over a secure network) the secure cloud of specialized insight servers and/or virtual insight machines to transform the secure digital data for the first, second, third and fourth digital data elements pursuant to the fifth, sixth and seventh digital data elements.

According to many exemplary embodiments, data transformation is optimized by one way secure digital data delivery across expandable computing resources. This includes not transmitting back the secure digital data for the first through sixth digital data elements to their origins. Instead, the fast destruction of this data is performed so as to speed up the transformation of a subsequent run.

According to exemplary embodiments, the secure cloud of specialized insight servers and/or virtual insight machines analyze the secure digital data for the last 50,000 patients treated with monoclonal antibody based biological drugs for adenocarcinoma of the lung, with a particular gene sequence to determine the drug(s) that maximized disease free months.

Additionally, the genomic data of this patient population will be analyzed for commonalities and differences, especially as it relates to the specific treatment(s) received. This includes analyzing gene sequences from lung tissue biopsies, taking into account cell types. Additionally, determinations may be made about "cocktail" treatments where based on the analysis, a plurality of monoclonal antibody based biological drugs would appear to have additive impact with respect to the particular performance metric selected. Such cocktail treatments may also include suggested treatments based on information obtained by analyzing the medical histories, such as dietary and exercise patterns.

At step 512, the intelligent agent determines an eighth digital data element. According to one exemplary embodiment, a percentage representing a percentage of the transformed results that should be selected is the eighth digital data element. In further exemplary embodiments, other factors may represent the eighth digital data element.

At optional step 513, the intelligent agent determines a ninth digital data element. According to one exemplary embodiment, an upper and/or lower outlier factor, representing a particular percentage of the highest and/or lowest of the transformation results to remove before performing step 512 is the ninth digital data element.

At step 514, the intelligent agent directs (via its circuitry over a secure network) the secure cloud of specialized insight servers and/or virtual insight machines to further transform the transformation results generated at step 511 pursuant to step 512 and optionally, step 513. According to one exemplary embodiment, the further transformation results in a list of names and/or identifiers of portions of the transformed results, but not the portions themselves.

In many exemplary embodiments, the transformation results generated at step 511 pursuant to step 512 and optionally, step 513 represent a massive amount of data. At step 514, computing performance is improved by scrubbing or clearing the data transferred from the secure cloud of specialized intelligent historical agents and/or virtual intelligent historical agents from names and/or identifiers of parts of that data. The names and/or identifiers are based on the output or outcome of the transformation performed at step 511 pursuant to step 512 and optionally, step 513. The amount of data represented by the names and/or identifiers is extremely small when compared to the secure digital data transferred from the secure cloud of specialized historical agents and/or virtual historical intelligent agents. Because the data transferred from the secure cloud of specialized intelligent historical agents and/or virtual intelligent historical agents was copied before the transmission, this data still resides in the secure cloud of specialized intelligent historical agents and/or virtual intelligent historical agents. The scrubbed names and/or identifiers is transformed into a list that may also include specification of digital data elements one through eight. The list is then securely transmitted to an intelligent operational agent.

The functioning of the intelligent operational agent, according to various exemplary embodiments, is enhanced by being focused on matching strategies to current conditions by being focused on such and not being hindered by having to consume time and resources in managing and processing the corresponding secure digital data that resides in the secure cloud of specialized intelligent historical agents and/or virtual intelligent historical agents. In comparison to systems to where both data sets reside in the same machine, the intelligent operational agent can more quickly match a strategy to a current condition and make a deployment.

According to further exemplary embodiments, a scrubbed situational deployment trigger such as exemplary scrubbed situational deployment trigger 107 (FIG. 1) is the transformed product produced at step 514. As described herein, most if not all of the secure digital data employed to generate the scrubbed situational deployment trigger 107 has been scrubbed by the clearing of the secure digital data from the secure cloud based specialized insight servers and/or the virtual insight machines 105 (FIG. 1). The scrubbed situational deployment trigger 107 comprises the names/identifiers of strategies determined at step 514 so that the strategies may be quickly recalled from the secure cloud based specialized intelligent historical agent 101 (FIG. 1) upon the occurrence of a particular current condition. In many exemplary embodiments, the scrubbed situational deployment trigger 107 also comprises digital data elements one through nine. After it is generated, the scrubbed situational deployment trigger 107 is transmitted from the secure cloud based specialized insight servers and/or the virtual insight machines 105 to the secure intelligent operational agent 104. As described in connection with step 515, upon the occurrence of a particular current condition (e.g. the tenth digital data element) that is the same as or approximates the condition for which the scrubbed situational deployment trigger 107 was produced (e.g. the six digital data element), the scrubbed situational deployment trigger 107 will cause the transmission of the named/identified strategies from the secure cloud based specialized intelligent historical agent 101 for execution at the activity server 102 (FIG. 1).

According to one exemplary embodiment, the further transformation produces a list of names and/or identifiers of optimal treatment strategies.

The scrubbed situational deployment trigger 107 comprises the names/identifiers of strategies determined at step 514 (e.g. monoclonal antibody ("Mab" based drugs) so that the associated information may be quickly recalled from the secure cloud based specialized intelligent historical agent 101 (FIG. 1) upon the occurrence of a particular current condition.

At step 515 the intelligent operational agent determines a tenth digital data element and executes a deployment strategy.

According to various exemplary embodiments, the tenth digital data element is a current condition. In some embodiments, the current condition may be similar to the sixth digital data element, a condition. Accordingly, the intelligent operational agent may access the list of names and/or identifiers corresponding to the sixth digital data element. Upon receiving a request from the intelligent operational agent, the secure cloud of specialized intelligent historical agents and/or virtual historical intelligent agents will function in parallel to send the secure digital data to the intelligent operational agent. The intelligent operational agent will then deploy the transferred data in a setting such as that exemplified by the activity server 102 (FIG. 1).

According to further exemplary embodiments, the intelligent operational agent may transmit to the activity server one or more decoy strings in the same string to confuse any unwanted hackers attempting to intercept such information. The activity server would only actually deploy the actual strategy.

Here, for example, the activity server may be connected to a gene sequencer at a cancer treatment center. The sequencer may be sequencing the DNA of a lung cancer biopsy tissue specimen. The scrubbed situational deployment trigger 107 at the secure intelligent operational agent 104 will be deployed based upon the occurrence of a particular current condition (e.g. the tenth digital data element being adenocarcinoma of the lung, with a particular gene sequence) that is the same as or approximates the condition for which the scrubbed situational deployment trigger 107 was produced (e.g. the six digital data element being adenocarcinoma of the lung, with a particular gene sequence), the scrubbed situational deployment trigger 107 causing the transmission of the associated information (e.g. genomic data and medical histories) from the secure cloud based specialized intelligent historical agent 101 for execution at the activity server 102 (FIG. 1) in the form of generating a personalized treatment plan.

While various embodiments have been described above, it should be understood that they have been presented by way of example only, and not limitation. The descriptions are not intended to limit the scope of the technology to the particular forms set forth herein. Thus, the breadth and scope of a preferred embodiment should not be limited by any of the above-described exemplary embodiments. It should be understood that the above description is illustrative and not restrictive. To the contrary, the present descriptions are intended to cover such alternatives, modifications, and equivalents as may be included within the spirit and scope of the technology as defined by the appended claims and otherwise appreciated by one of ordinary skill in the art. The scope of the technology should, therefore, be determined not with reference to the above description, but instead should be determined with reference to the appended claims along with their full scope of equivalents.

What is claimed:

1. An intelligent networked architecture comprising:
an intelligent agent having a hardware processor, the intelligent agent configured to automatically determine a first, a second, a third, a fourth, a fifth, a sixth, a seventh and an eighth digital data element, the intelligent agent configured to utilize a random number generator machine to optimize variables for processing runs;
a specialized intelligent historical agent having a hardware processor and a memory further comprising secure digital data corresponding to the first, the second, the third and the fourth digital data elements;
a specialized insight server having a hardware processor, the specialized insight server configured to receive from the specialized intelligent historical agent the secure digital data corresponding to the first, the second, the third and the fourth digital data elements and configured to transform the secure digital data corresponding to the first, the second, the third and the fourth digital data elements as directed by the fifth, the sixth, the seventh and the eighth digital data elements into a scrubbed situational deployment trigger, the scrubbed situational deployment trigger being a reduced size version of the secure digital data; and
an intelligent operational agent having a hardware processor, the intelligent operational agent configured to receive the scrubbed situational deployment trigger and cause the specialized intelligent historical agent to transmit a complete version of the secure digital data to the specialized insight server.

2. The intelligent networked architecture of claim 1, wherein the intelligent operational agent is configured to determine a tenth digital data element, and configured to deploy the scrubbed situational deployment trigger based on the tenth digital data element.

3. The intelligent networked architecture of claim 1, further comprising a load balancer having a hardware processor, the load balancer configured to distribute the secure digital data received by the specialized insight server.

4. The intelligent networked architecture of claim 3, wherein the load balancer is further configured to distribute processing of the secure digital data received by the specialized insight server.

5. The intelligent networked architecture of claim 1, wherein the first digital data element, the second digital data element, and the third digital data element are randomly generated by a hardware based random number generator.

6. The intelligent networked architecture of claim 1, wherein the first digital data element, the second digital data element, the third digital data element and the fourth digital data element are randomly generated by a hardware based random number generator.

7. The intelligent networked architecture of claim 1, wherein the first digital data element is a resource.

8. The intelligent networked architecture of claim 1, wherein the second digital data element is a resource segment.

9. The intelligent networked architecture of claim 8, wherein the third digital data element is an item on the resource segment.

10. The intelligent networked architecture of claim 1, wherein the fourth digital data element is a look back period.

11. The intelligent networked architecture of claim 1, wherein the fifth digital data element is a performance metric.

12. The intelligent networked architecture of claim 1, wherein the sixth digital data element is a condition.

13. The intelligent networked architecture of claim 1, wherein the seventh digital data element is an allocation amount.

14. The intelligent networked architecture of claim 1, wherein the eighth digital data element is a percentage for selection.

15. The intelligent networked architecture of claim 14, wherein a ninth digital data element is a percentage to remove from a population before executing the percentage for the selection.

16. The intelligent networked architecture of claim 1, wherein a tenth digital data element is a current condition.

17. A system, comprising:
a secure intelligent agent having a hardware processor and comprising a random number generator machine, the secure intelligent agent being configured to:
receive a first set comprising a plurality of digital data elements from a specialized intelligent historical agent, the plurality of digital data elements being associated with a time value;
utilize the random number generator machine to optimize variables for processing runs; and
in response to receiving the first set, instruct the specialized intelligent historical agent to:
copy and divide secure digital data corresponding to the plurality of digital data elements for the first set into parallel segments based on the optimized variables;
retain the secure digital data for the first set;
transmit a copied version of the secure digital data for the first set to an insight server over a secure channel; and
in response to transmitting the copied version of the secure digital data for the first set, the insight server being configured to:
transform the copied version of the secure digital data for the first set using a second set comprising additional digital data elements to generate a massive amount of data output; and
scrub the massive amount of data output to:
reduce a size of the massive amount of data output; and
generate a scrubbed situational deployment trigger that is a reduced size version of the copied version of the secure digital data for the first set, the scrubbed situational deployment trigger being provisioned to a secure intelligent operational agent.

18. The system according to claim 17, wherein the specialized intelligent historical agent is configured to perform rapid destruction of the first set and the second set to increase a speed of each subsequent processing run of the processing runs.

19. The system according to claim 17, further comprising a hardware based secure, high data transfer corridor having a specialized processor and a switch to facilitate unilateral or bilateral transfer of the secure digital data between any of the secure intelligent agent, the specialized intelligent historical agent, and the insight server.

20. The system according to claim 17, wherein the insight server transmits the scrubbed situational deployment trigger to the secure intelligent operational agent, the secure intelligent operational agent being configured to transmit the secure digital data retained by the specialized intelligent historical agent to the insight server when at least one condition specified in the scrubbed situational deployment trigger is met.

\* \* \* \* \*